Aug. 3, 1948.  M. C. HARROLD  2,446,474

MOTOR PROTECTIVE SWITCHING SYSTEM

Filed April 18, 1945

INVENTOR.
Marshall C Harrold
BY
Spencer Hardman and Fhr
attorneys

Patented Aug. 3, 1948

2,446,474

UNITED STATES PATENT OFFICE 2,446,474

MOTOR PROTECTIVE SWITCHING SYSTEM

Marshall C. Harrold, Dayton, Ohio, assignor to General Motors Corporation, Dayton, Ohio, a corporation of Delaware Application April 18, 1945, Serial No. 588,957

3 Claims. (Cl. 175—294)

This invention relates to electrical apparatus and more particularly to electric motor circuits.

In capacitor start and run motor circuits it is customary to use a motor circuit of the type disclosed in the Pearce Patent 2,255,437. One disadvantage of this circuit is that the starting relay closes a loop circuit of very low resistance containing the starting and running capacitors. The closing of this loop circuit causes the capacitors to discharge through this extremely low resistance loop circuit and provide a momentary heavy flow of current which tends to weld the relay contacts.

It is an object of my invention to provide an improved arrangement for minimizing the current flow through the starting contacts in a capacitor start and run motor circuit.

It is another object of my invention to prevent the formation of a loop circuit of low resistance containing the starting relay contacts and the capacitors when the starting relay contacts are closed.

In electric motors the temperature of the windings is the true limiting factor in preventing damage to the motor.

Where self-resetting overload protectors are provided, under overload conditions the protector will intermittently trip and reset. The ambient temperature as well as the length of time the protector is closed before tripping and the proportion of time the protector is open will determine the temperatures which the windings will eventually attain.

It is an object of my invention to provide a rapid tripping, slow resetting, overload protector in which the resetting is regulated according to the temperature of the motor windings.

It is another object of my invention to place a temperature responsive resistance in as direct a heat exchange relation as possible with the motor windings and to use said resistance to control the flow of current through a circuit which will regulate the operation of the overload protector.

Essentially to attain these objects I provide a double throw solenoid operated relay for connecting only the starting capacitor in the phase winding circuit during the starting period, leaving the running capacitor in an open circuit. The drop in current during the starting period eventually allows the solenoid to release the double throw switch to disconnect the starting capacitor and connect the running capacitor in the phase winding circuit. The motor is protected by a snap-acting thermal switch heated in response to current flow through the motor. The position of the resetting stop is advanced by a thermal element heated by a shunt circuit containing an iron wire temperature responsive resistance preferably wound among the motor windings.

Further objects and advantages of the present invention will be apparent from the following description, reference being had to the accompanying drawings, wherein a preferred form of the present invention is clearly shown.

Figure 1:
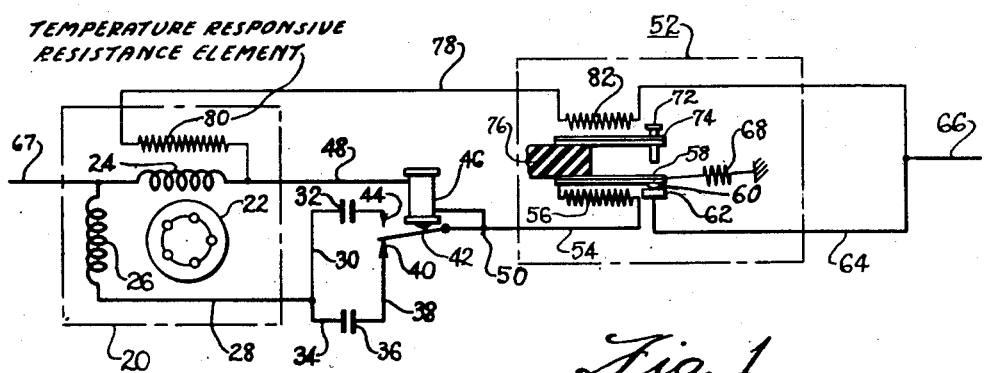
Fig. 1 is a wiring diagram of a motor circuit embodying my invention.
Figure 2:
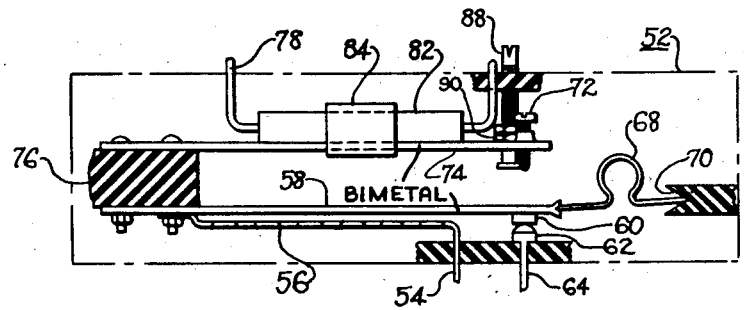
Fig. 2 is an enlarged view of the motor overload protector shown in Fig. 1.

Referring now to the drawings, there is shown in Fig. 1 an electric motor including a motor enclosure 20 illustrated diagrammatically by a dot and dash line. Within this enclosure is shown a rotor 22, the main winding 24 and a phase winding 26. One end of each of these windings is connected to the supply conductor 67. Connected to the phase winding 26 by the conductor 28 and the branch conductor 30 is the starting capacitor 32, which may be of the electrolytic type. A second branch conductor 34 connected to the conductor 28 connects to the running capacitor 36. The running capacitor 36 is connected by the conductor 38 to the lower contact 40 of a double throw switch 42. The starting capacitor 32 is connected to the upper contact 44 of the double throw switch 42. The double throw switch 42 is controlled by a solenoid 46 which is connected in series with the main winding 24 of the electric motor. The double throw switch 42 is connected to the main winding circuit 48 at the point 50.

When a power supply is connected to the opposite ends of the main winding circuit 48, current will flow through the main winding circuit and the solenoid 46 will be energized to cause the double throw switch 42 to contact the upper contact 44 to close the phase winding circuit. Current then will pass through the phase winding 26, the conductors 28 and 30 and the starting capacitor 32 and also the contacts 44 and 42. As the motor attains balance speed, the amount of current flowing through the main winding circuit 48 will have dropped sufficiently to cause the solenoid 46 to release the double throw switch 42 allowing it to move out of contact with the upper contact 44 and into contact with the lower contact 40. This will cause the current in the phase winding circuit to flow through the phase winding 26, the conductors 28 and 34, the running capacitor 36, the conductor 38, the contact 40 and the double throw switch 42.

By this arrangement, in neither position of the double throw switch 42 are the two capacitors 32 and 36 connected in a simple loop circuit without any substantial resistance. During the starting period the starting capacitor is connected in series with the phase winding 26 which limits the current flowing through the starting contact 44, while during the running period the running capacitor 36 is connected in series with the phase winding 26 which limits the current flow through the running contact 40. In each position, one of the capacitors is disconnected to prevent the formation of a loop circuit. By this very simple arrangement, I avoid the high transient currents through the starting relay contacts upon the closing of the phase winding circuit.

If a capacitor motor is stalled there is considerable danger that the motor protector will not trip rapidly enough to protect the motor, or if the protector does trip rapidly enough it will reset too rapidly and during successive closed periods of the protector the motor winding temperatures will rise to a value which will damage the insulation before the stalled motor condition is discovered.

To properly protect the motor and yet allow it to operate under as heavy loads as possible, I have provided an improved overload protector 52 which is connected in series with the motor. The conductor 54 extends from the point 50 to one end of an electric heater 56 provided within the overload protector. This heater 56 connects at its other end with the anchorage 76 of a cantilever bimetal strip 58 adapted to bend upwardly when heated. The free end of the strip 58 is provided with a contact 60 which cooperates with the stationary contact 62 to close and open the motor circuit. The contact 62 is connected by the conductor 64 to one of the supply conductors 66.

The heater 56 is located immediately beneath the cantilever bimetal strip 58 so that it supplies a certain amount of heat thereto. However, to make the strip 58 trip rapidly to the open position it is also self-heated by the current flowing through it. For very rapid tripping the heater 56 may be omitted and the electrical resistance of the bimetal strip 58 may be made high so that a large amount of heat is quickly put into this strip upon an overload. Preferably the amount of self-heating in the strip 58 and the amount of external heat provided by the heater 56 are so adjusted to give just the rate of heating desired to obtain maximum performance without damaging the motor windings.

The opening and closing of the strip 58 is regulated by the compression spring 68 which has one wedge-shaped end mounted in a V-notch at the extreme end of the cantilever bimetal strip 58 and the other wedge-shaped end held by a V-notch 70. The geometrical arrangement is such that the spring 68 is only at a slight angle relative to the strip 58 tending to hold it in closed position. When the bimetal strip 58 becomes sufficiently heated, it trips with a snap action to the open position against the adjustable resetting screws 72 which threads through the free end of a second bimetal cantilever strip 74 mounted upon the same anchorage 76 as the strip 58.

In order to adjust the restting time in accordance with the temperature of the motor windings an additional circuit 78 is provided. This circuit connects to the main winding circuit 48 at a point between the main winding and the solenoid 46. It includes a temperature responsive resistance 80 formed of insulated iron wire which is preferably wound within the center of the windings of the electric motor. It may be wound along with the motor windings as they are being wound. Iron wire within the range of temperatures of about 100° F. to 220° F. under which electric motors operate, has a large variation in its electrical resistance. However, if desired other forms of temperature responsive resistances may be used. The shunt circuit 78 also includes a resistor or resistance 82 which is preferably mounted on the reset bimetal cantilever strip 74 by means of a clamp 84. This resistor 82 may be of the ceramic type if desired. The other end of the shunt circuit 78 connects to the supply conductor 66. The reset bimetal strip 74 has its high expanding face on top so that it will bend downwardly when heated. This is limited by the projecting head of the adjustable stop screw 88 which is also provided with an adjusting nut 90 to limit the upward movement.

When the contacts 60 and 62 are closed the shunt circuit 78 is virtually deenergized since it is shunted around the contacts 60 and 62 as well as the solenoid 46 which has little resistance. However, when the contacts 60 and 62 open the shunt circuit 78 will be placed across the current supply in series with the main winding 24 which has a comparatively low resistance when the motor is idle. This causes considerable current to flow through the shunt circuit 78, which will vary in accordance with the temperature of the windings of the motor. The resistance 82 and the reset bimetal strip 74 will be heated in proportion to the current flow through the shunt circuit 78 which will vary inversely as the temperature of the motor windings. The protector is so designed and the stops so adjusted that it will always take longer for it to reset than is required for the bimetal strip 74 to attain its maximum temperature provided by the immediate shunt current. Consequently when the motor is cool the reset bimetal strip 74 will reach a higher temperature and will bend downwardly against the head of the stop screw 88 to provide the minimum open circuit period. When the motor windings are hot, the temperature responsive resistance 80 will reduce the shunt current so much that the strip 74 will not attain a high enough temperature to move away from the stop nut 90. This condition provides the maximum open circuit period. At intermediate motor winding temperatures the bimetal strip 74 will move to intermediate positions between the stops to provide corresponding intermediate reclosing times.

By virtue of this arrangement, this overload protector may be so adjusted that it will properly protect the motor.

While the form of embodiment of the invention as herein disclosed, constitutes a preferred form, it is to be understood that other forms might be adopted, as may come within the scope of the claims.

What is claimed is as follows:

1. An electric motor and control system adapted for connection to a power supply comprising a motor having an enclosure and a rotor and windings within the enclosure, a motor protector having contacts for disconnecting the motor from the power supply upon an overload, a shunt circuit shunting the motor protector contacts, said shunt circuit including a temperature responsive resistance located in heat exchange relation with said windings, said shunt circuit also including reset regulating means responsive to the current flow in the circuit for regulating the resetting time of said overload protector according to the motor winding temperatures.

2. An electric motor and control system adapted for connection to a power supply, comprising a motor having an enclosure and a rotor and windings within the enclosure, a snap acting motor protector having contacts for disconnecting the motor from the power supply upon an overload, said protector being provided with a resetting stop and thermal means for moving said stop to reduce the resetting period upon an increase in its temperature, a shunt circuit for shunting said protector contacts, said shunt circuit including a temperature responsive resistance in heat exchange relation with said motor windings and a means for heating said thermal means, said resistance having a rising resistance to current flow in accordance with increasing temperature.

3. An electric motor and control system adapted for connection to a power supply, comprising a motor having an enclosure and a rotor and windings within the enclosure, a thermal motor protector having contacts for disconnecting the motor from the power supply, and a heating circuit for said protector to regulate the operation of the protector according to motor temperatures including a temperature responsive resistance located in heat exchange relation with the motor windings, said temperature responsive resistance varying the flow of current through said heating circuit in accordance with motor winding temperatures.

MARSHALL C. HARROLD.

REFERENCES CITED

The following references are of record in the file of this patent:

UNITED STATES PATENTS

| Number | Name | Date |
|---|---|---|
| 1,707,424 | Bailey | Apr. 2, 1929 |
| 1,729,561 | Vaughan | Sept. 24, 1929 |
| 2,057,175 | Werner | Oct. 13, 1936 |

FOREIGN PATENTS

| Number | Country | Date |
|---|---|---|
| 171,136 | Switzerland | Aug. 15, 1934 |